US012765477B2

(12) United States Patent
Baars et al.

(10) Patent No.: US 12,765,477 B2
(45) Date of Patent: Oct. 20, 2026

(54) METHOD OF PREPARING A PLANT FOR TRANSPORT, AND AN APPARATUS

(71) Applicant: J. van Dam Onroerend Goed B.V., Opheusden (NL)

(72) Inventors: Hendrik Baars, IJzendoorn (NL); Gerrit Baars, Kesteren (NL)

(73) Assignee: J. van Dam Onroerend Goed B.V., Opheusden (NL)

( * ) Notice: Subject to any disclaimer, the term of this patent is extended or adjusted under 35 U.S.C. 154(b) by 14 days.

(21) Appl. No.: 18/842,605

(22) PCT Filed: Mar. 2, 2023

(86) PCT No.: PCT/NL2023/050101

§ 371 (c)(1),
(2) Date: Aug. 29, 2024

(87) PCT Pub. No.: WO2023/167587

PCT Pub. Date: Sep. 7, 2023

(65) Prior Publication Data

US 2025/0169406 A1 May 29, 2025

(30) Foreign Application Priority Data

Mar. 2, 2022 (NL) ...................................... 1044275

(51) Int. Cl.
*A01G 23/04* (2006.01)
*A01G 23/06* (2006.01)
(Continued)

(52) U.S. Cl.
CPC .................................. *A01G 23/043* (2013.01)

(58) Field of Classification Search
CPC .... A01G 23/04; A01G 23/043; A01G 23/046; A01G 23/06; B65B 11/02; B65B 11/025;
(Continued)

(56) References Cited

U.S. PATENT DOCUMENTS 3,709,263 A 1/1973 Jackson et al.
4,242,295 A * 12/1980 Urquhart ................ B26D 3/001 156/244.18
(Continued)

FOREIGN PATENT DOCUMENTS

CN 208159578 U * 11/2018
CN 211407093 U 9/2020
(Continued)

*Primary Examiner* — Shelley M Self
*Assistant Examiner* — Patrick B Fry
(74) *Attorney, Agent, or Firm* — The Webb Law Firm

(57) ABSTRACT

A method of preparing a plant for transport, said plant including a root system embedded in soil, and woody member such as a stem. The method includes the step of wrapping the root system together with the surrounding soil. To prepare the plant for transport in a less laborious manner, the step of wrapping the root system together with the surrounding soil includes encompassing the root system together with the surrounding soil by wrapping an oblong band of flexible material, preferably a net, around the root system and surrounding soil multiple times using a wrapping device.

23 Claims, 8 Drawing Sheets

(51) Int. Cl.
*B65B 11/02* (2006.01)
*B65B 11/04* (2006.01)

(58) Field of Classification Search
CPC .. B65B 11/04; B65B 2210/16; B65B 2210/18
USPC ..... 53/397, 203; 47/1.01 P, 65, 65.5, 73, 76, 47/78
See application file for complete search history.

(56) References Cited

U.S. PATENT DOCUMENTS

| | | | | |
|---|---|---|---|---|
| 4,332,093 | A * | 6/1982 | Berthollet | A01G 23/043 171/62 |
| 6,688,076 | B1 * | 2/2004 | Rivera, Jr. | B65B 25/24 53/204 |
| 10,011,383 | B2 * | 7/2018 | Suolahti | B65B 59/04 |

FOREIGN PATENT DOCUMENTS

| | | | | | |
|---|---|---|---|---|---|
| CN | 111919702 | A | * | 11/2020 | B65B 11/04 |
| CN | 112075317 | A | | 12/2020 | |
| CN | 112438174 | A | | 3/2021 | |
| CN | 213343721 | U | | 6/2021 | |
| CN | 113207610 | A | * | 8/2021 | A01G 23/062 |
| CN | 215582796 | U | | 1/2022 | |
| JP | S59132829 | A | | 7/1984 | |
| NL | 2001286 | C2 | | 2/2009 | |

* cited by examiner

METHOD OF PREPARING A PLANT FOR TRANSPORT, AND AN APPARATUS

CROSS-REFERENCE TO RELATED APPLICATIONS

This application is the United States national phase of International Patent Application No. PCT/NL2023/050101 filed Mar. 2, 2023, and claims priority to The Netherlands Patent Application No. 1044275 filed Mar. 2, 2022, the disclosures of which are hereby incorporated by reference in their entireties.

BACKGROUND OF THE INVENTION

Field of the Invention

The invention concerns a method of preparing a plant for transport, said plant comprising
- a root system embedded in surrounding soil, and
- a woody member,
  - wherein the method comprises the step of wrapping the root system together with the surrounding soil. The invention further relates to an apparatus and device for performing the method of preparing a plant for transport.

Description of Related Art

Plants comprising woody members, such as a tree comprising a stem or a shrub comprising woody branches, hereinafter for the sake of brevity only referred to as a tree, are often cultured by tree growers on a patch of land and when the tree has reached a desired size, the tree is harvested to be sold and planted elsewhere. To enhance the success of this transplant, it is important that the root system does not dry out. It is also necessary that the plant can gradually adapt to soil of the location where it is re-planted, which is accommodated for by including the surrounding soil of the original location.

After excavating the tree, for example with a machine comprising a rotatable hemi-circularly curved blade, it is known to package the root system plus surrounding soil in burlap and hold the burlap and soil in place using an iron gauze. This step is labor intensive.

CN215582796U discloses a tree transplanting protection device for garden construction, and comprises wrapping structure which rotates around a vertical axis. A film is wrapped around the root system with substantially horizontal windings.

SUMMARY OF INVENTION

The invention concerns a method according to the preamble wherein the plant is prepared for transport in a less laborious manner.

The invention is defined by a method of preparing a plant for transport having the features as described herein. Advantageous embodiments and further ways of carrying out the invention may be attained by the measures as described herein.

According to the invention, the step of wrapping the root system together with the surrounding soil comprises encompassing the root system together with the surrounding soil by wrapping an oblong band of flexible material around the root system and surrounding soil multiple times using a wrapping device.

It has been found that soil can be held in place in a satisfactory manner using such a band.

The band has typically a width of at least 1 cm, and advantageously a width of at least 4 cm, preferably at least 6 cm.

The use of a relatively wide band compared to a less wide band will also require fewer revolutions of the band around the root system, and can hence be performed quicker.

The invention also concerns a method of harvesting a tree, said tree comprising a root system embedded in the earth, wherein the method comprises the step of extracting the tree from the earth, wherein the root system of tree is extracted from the earth together with surrounding soil, followed by the method according to the invention.

It is preferred that the band is made of biodegradable material. The band is for example made of natural fibers, such as hemp, jute, sisal etc. although a biodegradable plastic (e.g. based on polylactic acid) may also be feasible.

The band may be a perforated or non-perforated band. The latter may be provided with holes after wrapping, if desired. This, in particular, provides advantages by allowing exchange of gases (in particular oxygen).

In an embodiment, the wrapping device comprises a wrapping head and a gripper configured to hold the woody member of the plant. The wrapping head is configured to circle a band dispenser along a circular path in a plane of rotation around a wrapping space of the wrapping head. The wrapping head is rotatably coupled to the wrapping device to enable a changing in the orientation of the plane of rotation with respect to the gripper. The action of wrapping comprises:
- the gripper keeping the root system in the wrapping space;
- circle the band dispenser along the circular path to wrap the band along the root system with circular paths in planes of rotations having multiple orientations.

These features allow for better and neater wrapping of a root ball comprising the root system of a plant together with the surrounding soil on the sides as well as on the top and bottom. Furthermore, by reducing the upper and lower parts of the root ball not covered by the band, less soil is lost during transport.

In a further embodiment, the wrapping head comprises a first ring section and a second ring section movable in the first ring section, wherein the first ring section is rotatably coupled to the gripper. Furthermore, the first ring section serves as a guide for rotating the second ring section in the first ring section. The band dispenser is attached to the second ring section. The method further comprises rotating the second ring section in the first ring section. These features allow the band to wrap nearly perfect windings around the centre of the root ball.

In a further embodiment, the first ring section and the second ring section each have a corresponding opening that, when both openings coincide, forms a side opening of the wrapping head. This enables placement of the root system of the plant in the wrapping space by horizontal displacement of the wrapping device. Consequently, the method further comprises horizontally displacing the wrapping device or plant to position the root system of the plant in the wrapping space.

In an embodiment, the band dispenser comprises a roll holder and a net spreader configured for guiding the band from the roll holder to the root system. The method further comprises guiding the band from the roll holder to the root system during wrapping of the root system by a net spreader. Because the band is wrapped around the root ball with some tensile tension, the band can be stretched slightly, making it narrower. The net spreader reduces the narrowing of the band due to tensile stress, allowing the band to be wrapped around the ball with a greater width than without using the net spreader.

In a further embodiment, the net spreader further comprises a knife configured to cut the band lengthwise and the band is a tubular net. The method further comprises cutting the tubular net lengthwise before wrapping the net around the root system. A tubular net has the property of having a net structure, which can adapt to the outer surface of the ball to some extent. This is due to the knitted mesh styles of the tubular net. When stretched lengthwise the net becomes narrower there, and conversely when stretched widthwise the net becomes shorter there.

In an embodiment, the gripper is rotatable along an axis X1 (shown in FIG. 1A) through the gripper and the wrapping space. The method further comprises rotating the root system in the wrapping space by rotating the gripper. Turning the plant while wrapping can further reduce the uncovered area around a plant's stem.

In an embodiment, the gripper is movable with respect to the wrapping head to change during wrapping the distance between the gripper and the wrapping space. The method further comprises moving the root system vertically in the wrapping space by changing the distance between the gripper and the wrapping space. This feature allows aligning the midpoint of the root system with the plane of rotation of the band dispenser. This feature allows the underside of the root ball to be completely neatly covered with the band material when the midpoint of the system root is located above the centre of the circular path of the band dispenser.

It is preferred that at least during a first part of the step of wrapping, the step of wrapping the band around the root system and surrounding soil is performed while the plant is placed with its root system and surrounding soil on a support surface 102 (shown in FIG. 1B).

Placing the tree away from the location where it has been extracted from the earth allows it to be placed on a support surface 102 (shown in FIG. 1B) facilitating wrapping the root system and surrounding soil, preferably on a substantially planar support surface which helps to reduce interference of the surroundings with the wrapping step.

It is preferred that the plant is held by a woody member thereof while the step of wrapping the root system and surrounding soil is performed.

This facilitates wrapping of the band of flexible material around the root system.

Holding the stem may also be used to reduce force exerted by the tree on the root system when placed on a support surface, thus helping to reduce loss of soil by crumbling.

According to a preferred embodiment, during a part of the step of wrapping after the first part, the step of wrapping the band around the root system and surrounding soil is performed while the tree is held by the woody member and with the root system at a distance from the earth to envelope the root system and surrounding soil at the bottom side of said root system.

This reduces the risk of loss of soil via a lower portion of the wrapped root system and hence of drying out of (at least a part of) the root system.

The woody member will be capable of holding the weight of the plant including soil. For trees this is preferably the stem.

It is preferred that the band is a net.

The roots will help to retain the net in place without the band cutting into the root system and pushing away the soil, and the soil is held in place by the net.

This reduces the amount of material necessary, allows for the ingress of oxygen and/or water to the root system and facilitates the growth of the roots through the band once the plant has been replanted at a new location.

An oblong band in the form of a net can easily deform and adapt to tightly wrap the root system and surrounding soil.

The mesh size of the net may be quite large, such as 10 cm in the larger direction, but a relatively large mesh size will typically require that the band is wrapped around the root system and surrounding soil more times that one with a smaller mesh size. For this reason smaller mesh sizes are preferred, such as 4 cm or smaller and preferably 2 cm or less.

It is preferred that the net comprises at least three threads extending in a longitudinal direction of the band.

This helps to wrap the net around the root system and surrounding soil with the net more effectively as it helps to retain the width of the net relatively well.

It is preferred that the number of longitudinally extending threads is preferably at least 5, more preferably at least 8.

It is preferred that the number of longitudinally extending threads is between 3 and 10 per 10 cm width of the net.

It is more preferred that the wrapping device comprises a wrapping head and a net spreader, wherein the net is a tubular net, the net is spread using the net spreader inserted into the tubular net, and the net spreader comprises a knife at a side facing away from the center of the wrapping head, and while the step of wrapping is performed the tubular net is cut by the knife and the cut net is wrapped around the root system and surrounding soil.

Thus excellent wrapping results are obtained. The net spreader, for example, comprises a tapered board with a knife transverse to the board, the cutting edge of the knife facing away from the tapered board.

For a tubular net, it is preferred that the number of longitudinally extending threads is three or less. It is most preferred that the net is composed of threads that do not extend in the longitudinal direction of the net.

It is preferred that the root system and surrounding soil are first wrapped in a rotational direction having an axis parallel to the centerline of the stem, following which the plant is lifted and the root system and surrounding soil are wrapped in a rotational direction having an axis at an angle to the centerline of the stem.

Thus the root system and surrounding soil is wrapped more fully.

It is preferred that the wrapping device comprises a wrapping head and to change the angle of the rotational direction of wrapping the wrapping head is rotated while the stem of the tree is held.

This allows for the wrapping to be performed in a relatively tight space.

The invention also relates to an apparatus comprising a mast, a wrapping device and a gripper, said wrapping device comprising a wrapping head comprising a first ring and a moveable second ring wherein the first ring serves as a guide for the second ring, the wrapping head further comprising an opening for allowing access to the center of the rings and the wrapping head and the gripper being moveable along the mast.

Such an apparatus is suitable for the method according to the invention. The gripper may be connected to the wrapping device. The wrapping head is preferably rotatable about an axis transverse to the mast. The apparatus preferably comprises a mast with the gripper being moveable along the mast. The apparatus is preferably a vehicle. The invention also relates to any measures and preferred embodiments discussed above for the method in any combination.

The invention also relates to a wrapping device as described herein. Advantageous embodiments and further ways of carrying out the invention may be attained by the measures mentioned in the dependent claims.

BRIEF DESCRIPTION OF THE DRAWINGS

These and other aspects, properties and advantages will be explained hereinafter based on the following description with reference to the drawings, wherein like reference numerals denote like or comparable parts, and in which.

DESCRIPTION OF THE INVENTION

Figure 1A:
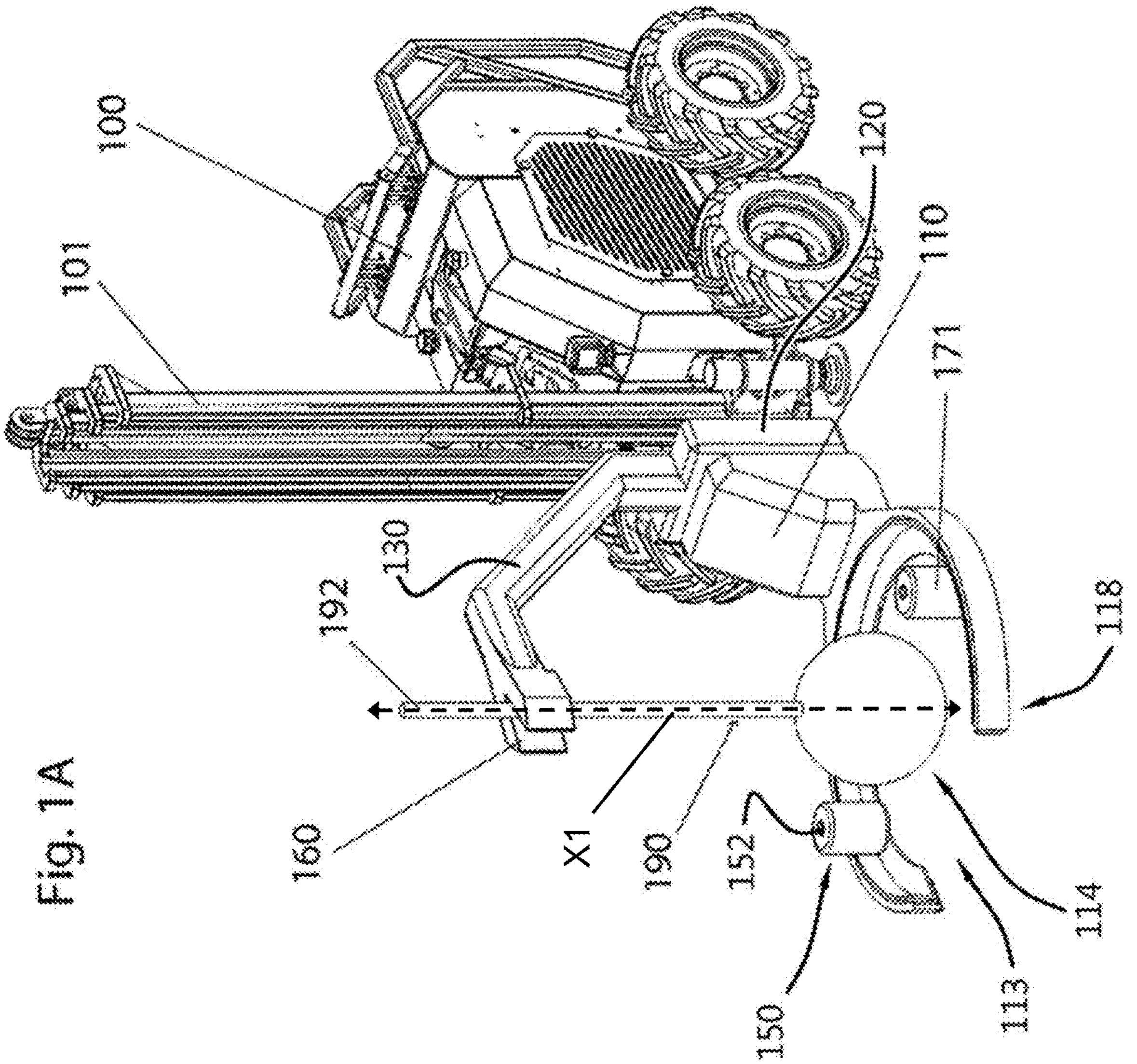
FIG. 1A to FIG. 1D illustrate perspective views of a wrapping apparatus and illustrate the method according to the invention.
Figure 1B:
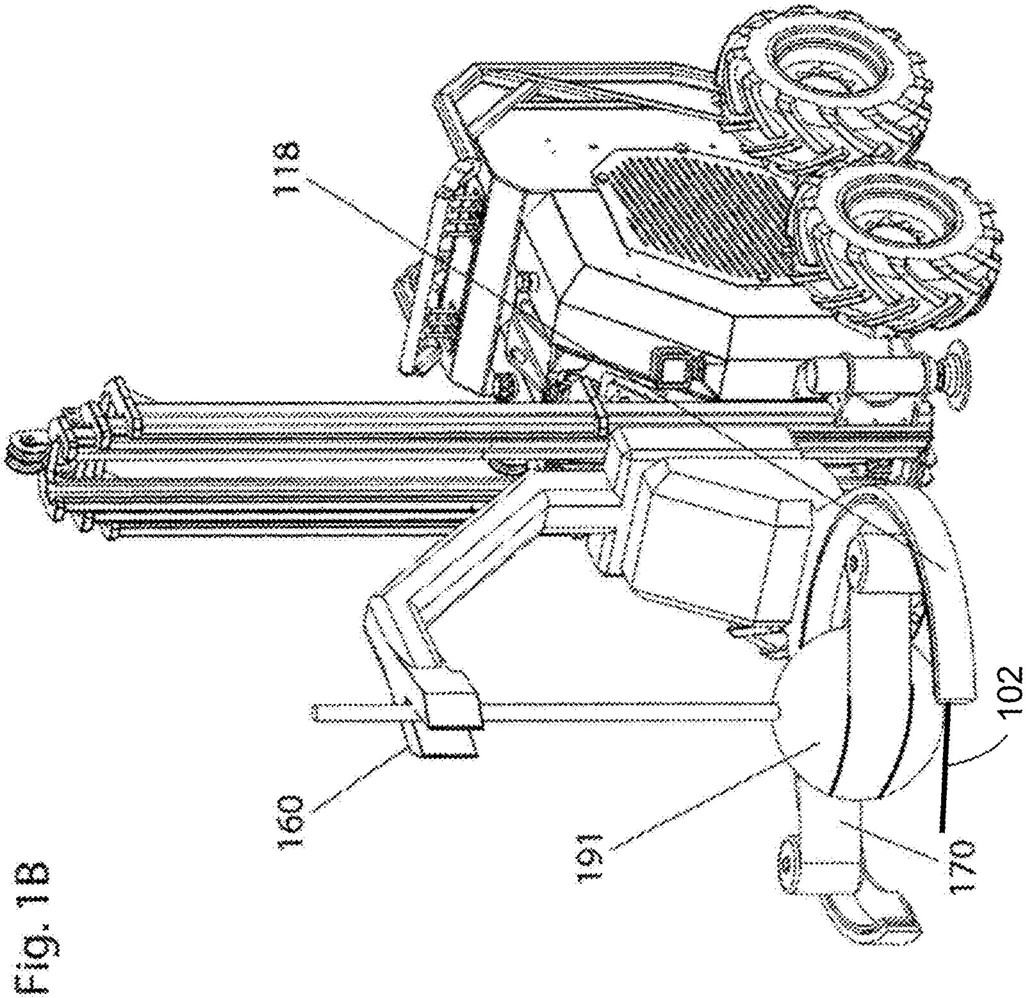
Figure 1C:
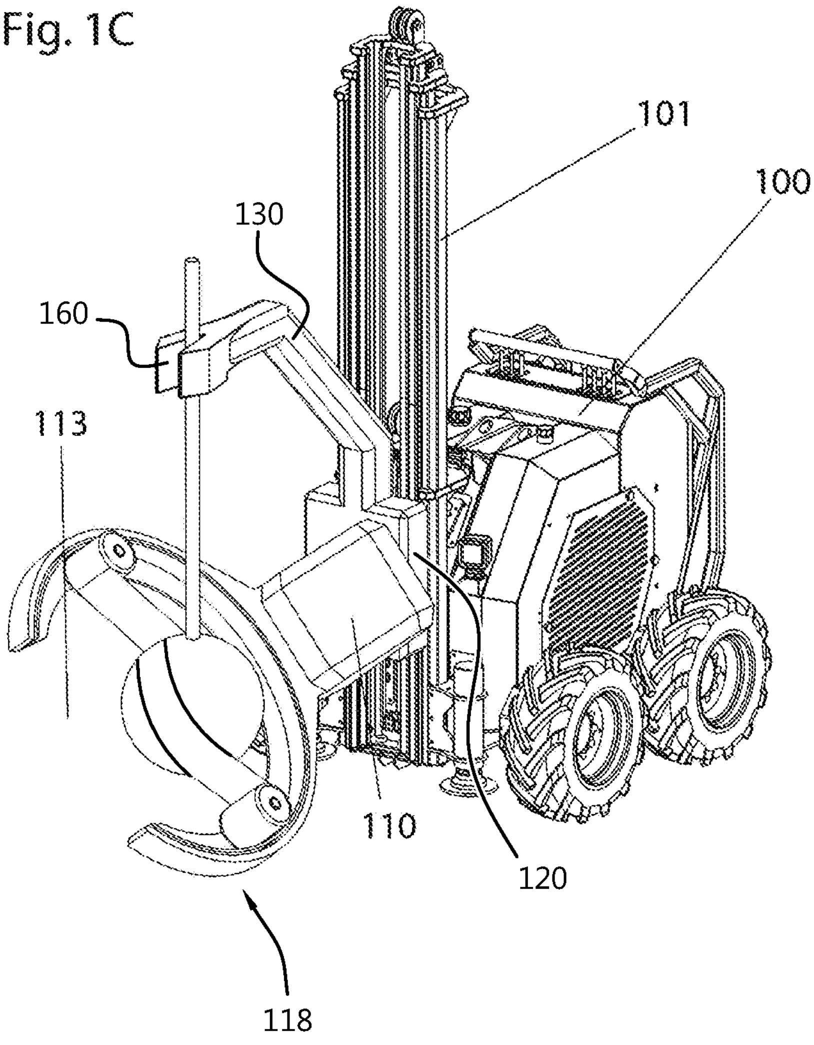
Figure 1D:
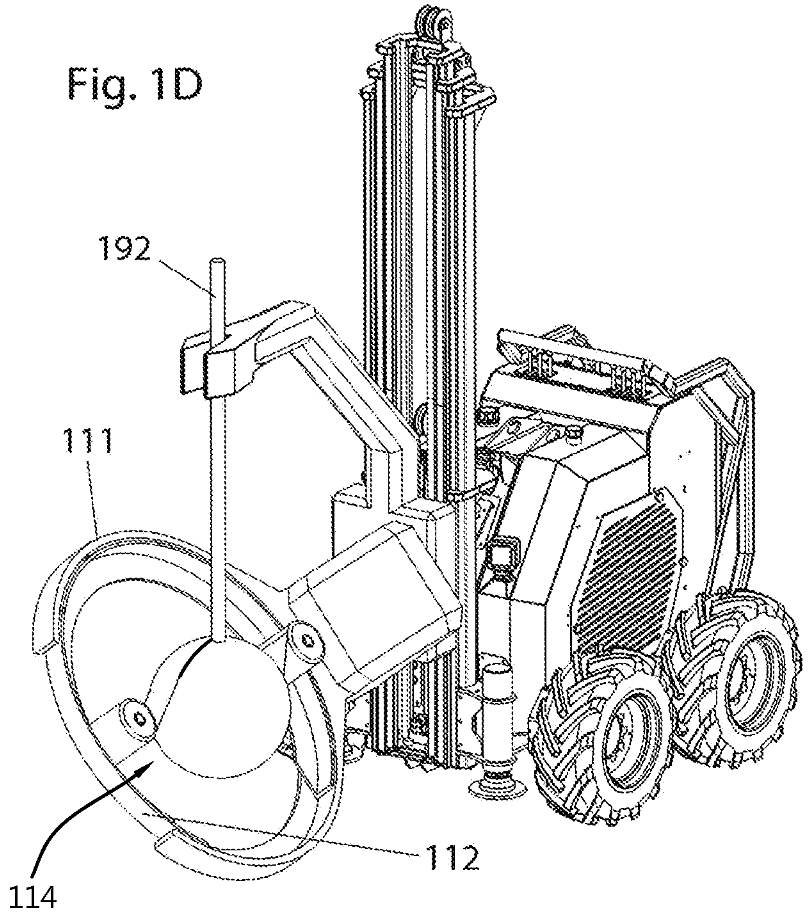

FIG. 1A to FIG. 1D show perspective views of a wrapping apparatus 100, here a vehicle 100 capable of carrying a wrapping device 110, said device 110 comprising a wrapping head 118, and said device 110 mounted moveably on a mast 101. A vehicle 100 of this nature is known in the art for wrapping the upper section of a plant 190, here a tree 190 in a net.

In accordance with the present invention, a root system of the tree and the soil surrounding the root system 191 is wrapped with an oblong band 170, here a net 170 dispensed from a roll 171.

As known in the art, the wrapping head 118 comprises a first ring section 111 (here an outer ring section) and a second ring section 112 (here an inner ring section). The first ring section 111 serves as a guide for the second ring section 112. Both the first ring section 111 and the second ring section 112 are open rings with an opening 113 between the ends of the open ring. When the openings 113 coincide, the wrapping head 118 has an opening 113 for allowing a tree to pass to the center of the ring sections and to position the tree in a wrapping space 114. The wrapping space is the free space in the wrapping head 118 which boundary is formed by parts of the wrapping head rotating during wrapping a root system. The second ring section 112 has a length that is not only sufficient to span said opening 113, but also to be driven by two spaced apart motors (not shown) located at the opposite side of the opening 113. The second ring section 112 is provided with rolls 171. The rolls are positioned on roll holders 152. Each roll holder 152 is part of a band dispenser 150. The band dispenser is attached to the second ring section 112.

In accordance with the present invention, the wrapping device 110 comprises a base structure 120, the wrapping head 118 and a gripper 160 configured to hold a woody member of the plant. The gripper 160 is coupled to the base structure by an arm 130. The wrapping head configured to circle the band dispenser 150 along a circular path in a plane of rotation around the wrapping space 114 of the wrapping head. The wrapping head 118 is rotatably coupled to a base structure 120 of the wrapping device to allow changing the orientation of the plane of rotation relative to the direction of the woody member 192 of the plant hold by the gripper. The base structure 120 comprises further a coupling structure (not shown) to couple the wrapping device 110 to other vehicles have a mating coupling structure. Some non-limiting examples of such vehicles are a loader, a shovel, a tractor with front loader, forklift.

The gripper 160 in FIGS. 1A-1D is attached rigidly to the arm 130. Alternatively, the gripper is rotatably coupled to the arm to enable to rotate a stem of a tree hold by the gripper along its length axis X1. By rotation of the stem, the root system is rotated in the wrapping space.

Figure 2A:
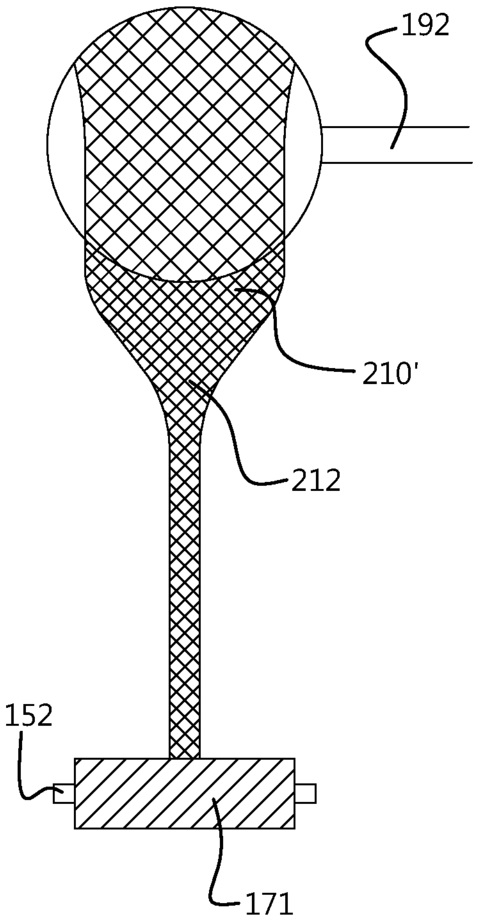
FIG. 2A illustrates a side view of a part of a preferred wrapping apparatus.
Figure 2B:
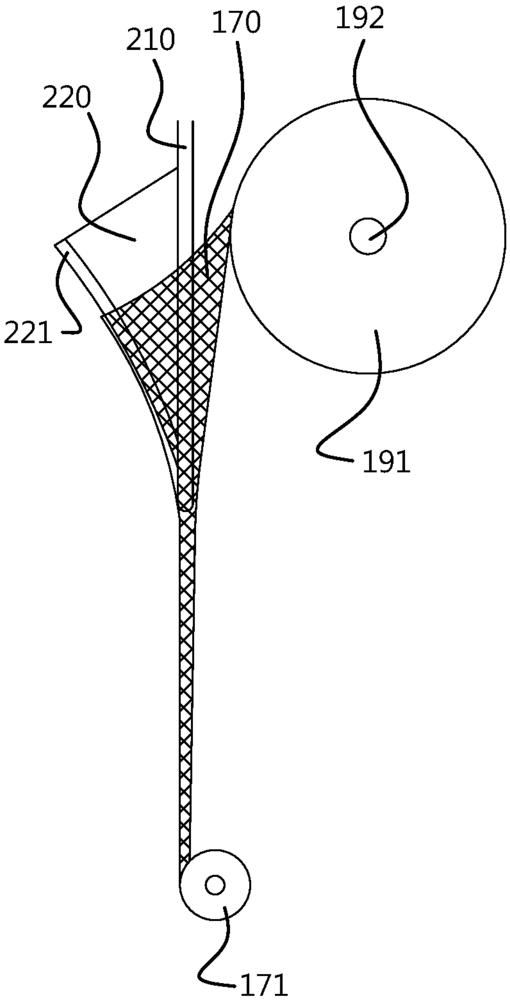
FIG. 2B illustrates a top view of a part of a preferred wrapping apparatus.

Optionally, the base structure 120 is configured to move the gripper with respect to the wrapping head to change during wrapping the distance between the gripper and the wrapping space. In an embodiment, a coupling structure coupling the wrapping head to the base structure allows the wrapping head to be moved up/down with respect to the base structure. In another embodiment, a coupling structure coupling the gripper to the base structure allows the gripper to be moved up/down with respect to the base structure. To wrap the root system and surrounding soil 191 in accordance with the method according to the invention, the tree 190 is held by its stem 192 by gripper 160. In the embodiment discussed here, the gripper 160 is attached to the wrapping head 118. The free ends of the nets 170 from the rolls 171 are hooked to root system and surrounding soil 191 (FIG. 1B), which is easily accomplished due to the presence of roots. This can also be achieved using a wooden pin (skewered meat pin), a staple, and/or the like. Alternatively, the free end can be attached to the stem. After attaching the free end, the second ring section 112 is rotated, which causes the net 170 to be wrapped around the root system and surrounding soil 191 along a circular path having a plane of rotation. Wrapping the net 170 around the root system and surrounding soil 191 can be performed while the plant is placed with the root system and the surrounding soil on a support surface 102. The tree 190 is then lifted by moving the wrapping head 118 and gripper 160 upwards along the mast 101. In an exemplar embodiment, the wrapping head 118 is rotated over an angle of 60° about an axis transverse to the mast 101 and wrapping is continued. A rotation over an angle of 60° corresponds to a change of the plane of rotation of 60°. The wrapping head 118 is also rotated in the opposite direction and wrapping is continued. The wrapped nets 170 are cut loose from the rolls 171. If desired or necessary, the free ends of the wrapped nets 170 can be secured. It will be obvious to the skilled person, that the wrapping can be continued while the plane of rotation gradually changes from 0° (horizontal plane) to +60° and then gradually to −60° and optionally finally to 0° The maximum angular change of the plane of rotation depends on the construction of the wrapping head and is not limited to +/−60°. For example, if the components of the band dispenser are attached below the upper surface of the first and second ring section, a larger angular change is possible than when some component protrudes above the upper surface of the first and second ring section. The upper surfaces of the first and second ring section are defined by a wrapping head in a position with a horizontal plane of rotation. FIG. 2A and FIG. 2B show schematically a side view of and a top view of a part, also referred to in the present application as band dispenser, of a wrapping apparatus to illustrate a preferred embodiment of the method of preparing a plant for transport. In this preferred embodiment of the method, the net 170 on the roll 171 is a cylindrical or tubular net, which is cut in a longitudinal direction of the net before being wrapped around the root system and surrounding soil 191. A tubular net has the property of having a net structure, which can adapt to the outer surface of the ball to some extent. This is due to the knitted mesh styles of the tubular net. When stretched lengthwise the net becomes narrower there, and conversely when stretched widthwise the net becomes shorter there lengthwise the band. The net 170 is a net made-up of non-longitudinal extending threads, making it very suitable to follow the shape of the root system and surrounding soil 191. To wrap the net 170, the moveable second ring 112 of the wrapping head 118 is provided with a band dispenser 150 comprising a roll holder 152 and a net spreader 210, which comprises a board 210' with a tapered distal end 212. The net spreader 210 is configured for guiding the band from the roll holder to the root system. At a side of the board opposite of the center of the second ring 112 a knife 220 is provided, its cutting edge 221 facing away from said center. The net spreader 210 spreads the net 170 and brings it under sufficient tension to allow the knife 220 to cut the net 170. The cut end of the net 170 is used to wrap around the root system and surrounding soil 191.

Figure 3A:
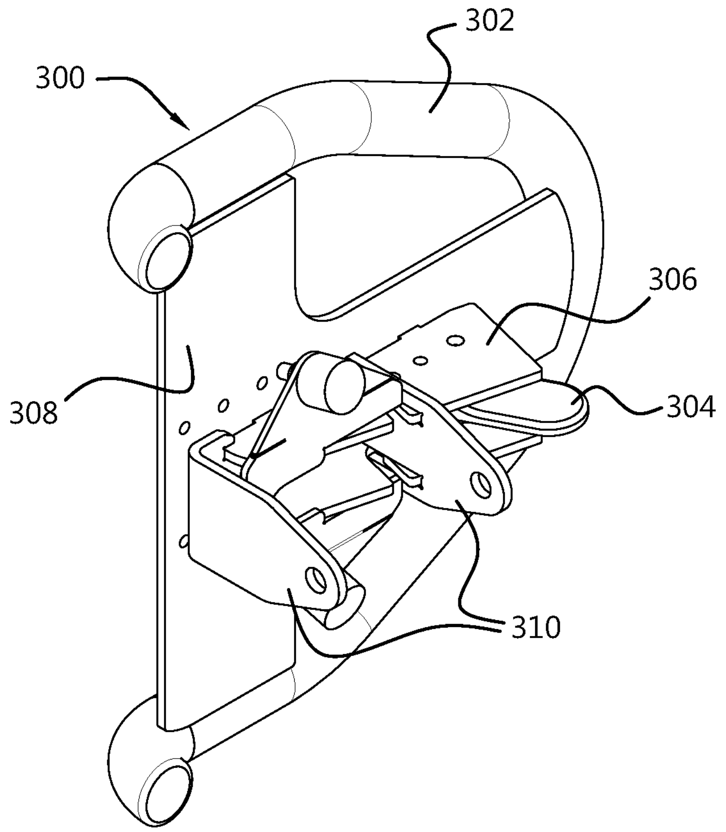
FIG. 3A illustrates a perspective view of an embodiment of a net spreader.
Figure 3B:
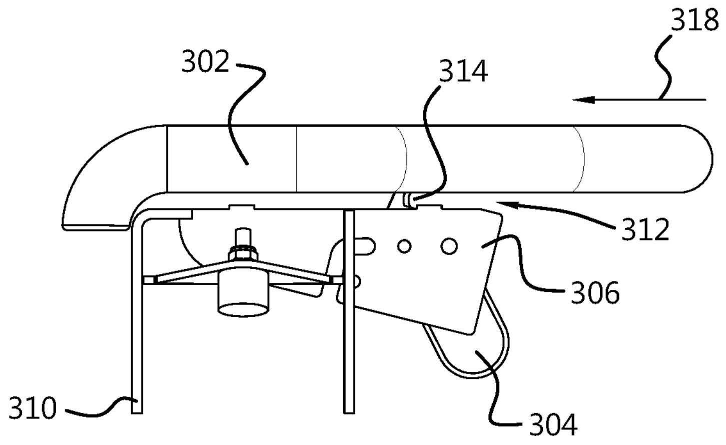
FIG. 3B illustrates a top view of the net spreader shown in FIG. 3A.

FIG. 3A and FIG. 3B illustrate a perspective and top view of an embodiment of a net spreader 300. The net spreader comprises a V- or U shaped tubular profile. 302. A support structure 308 is provided between the legs of the V- or U-shaped tubular profile. A coupling structure 310 is attached to the support structure. The coupling structure 310 provides a hinge point with an axis parallel to the legs of the tubular profile 302. The coupling structure 310 allows the spreader to follow the shape of the root system. This improves the way the net is wrapped around the root system. Furthermore, a knife support plates 306 are attached to the support structure 308. A knife is positioned in a knife protector 304. The knife is a commonly known hook knife. A channel 312 between the tubular profile and knife support plates provides a passage for the tubular net to the cutting edge 314 of the hook knife. In FIG. 38, arrow with reference numeral 318 indicates the direction the tubular net is transported across the spreader 300.

Figure 4A:
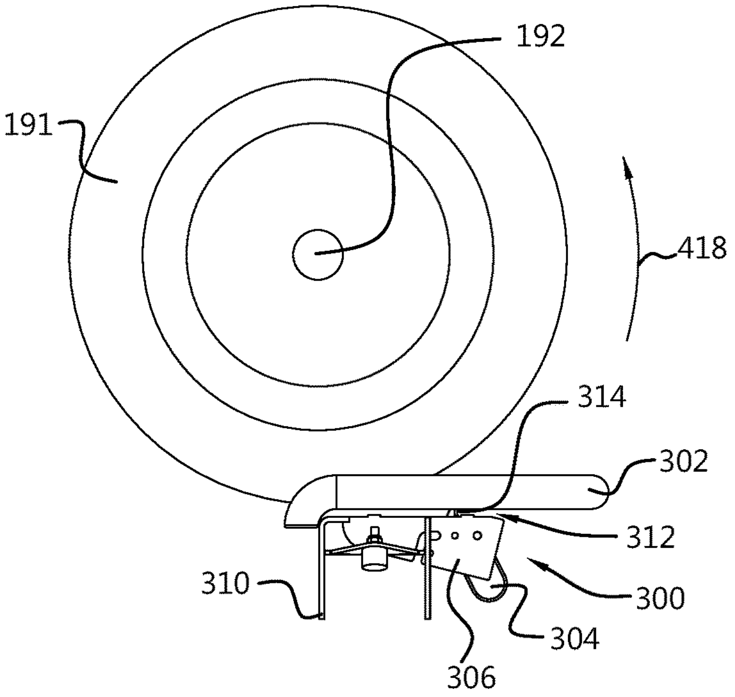
FIG. 4A illustrates a top view of the position of the net spreader with respect to the root system during wrapping.
Figure 4B:
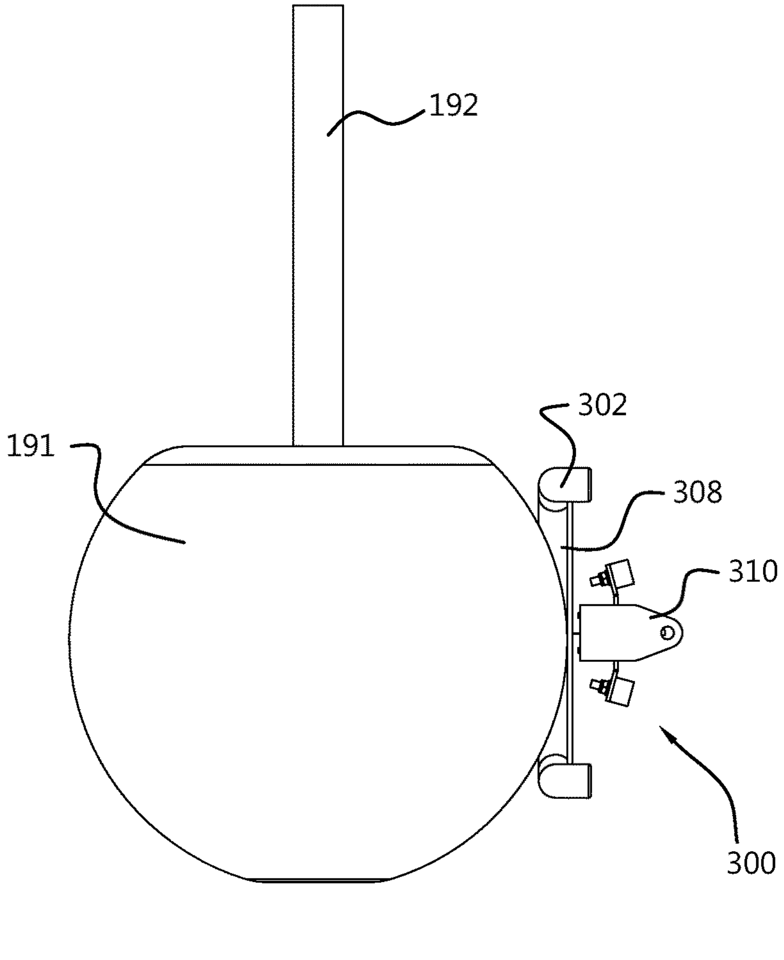
FIG. 4B illustrates a side view of the position of the net spreader with respect to the root system during wrapping; and, FIG. 4C illustrates a perspective view of the position of the net spreader with respect to the root system during wrapping.
Figure 4C:
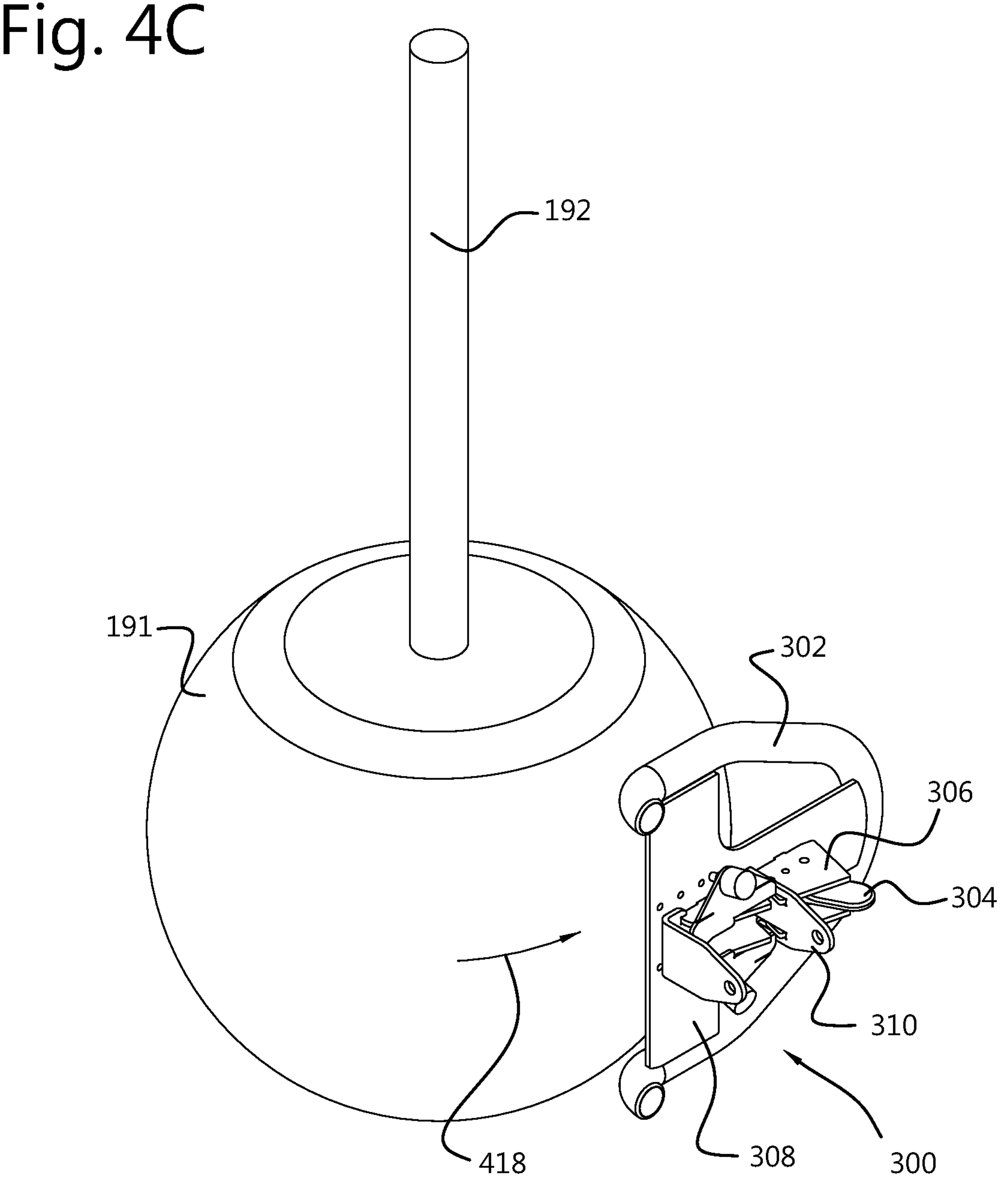

FIG. 4A-FIG. 4C illustrate how the band dispenser will be pushed against the root system 191 by means of a pushing device (not shown). The pushing device ensures that the spreader is pushed against the root system. The smaller the distance is, the better the band is wrapped around the root system. In the present embodiment, the support structure 308 is a flat plate. When using a support structure having a curvature corresponding to the rounding of the root system, the distance between the exterior of the ball shaped root system and the two legs can be reduced. This allows the net to be wrapped more accurately around the root system.

The net spreader will be moved in the direction of the closed side of the V- or U-shaped profile. In FIG. 4A shows a top view, arrow with reference numeral 418 indicates the rotation direction of the net spreader 300 around the root system 191 and stem 192 of the plant.

In an advantageous embodiment, a movable arm (not shown) couples the spreader 300 to the second ring section 112 of the wrapping head. The movable arm is configured to move the net spreader to and from the centre of the wrapping area 114 of the wrapping head. When a root ball is placed in the wrapping area, the net spreader is positioned near the second ring section. During wrapping, the net spreader is forced to move to the centre of the wrapping space and is pressed slightly against the periphery of the root ball. In this way, the elongated open-cut tubular net can be properly wrapped around the root ball with the desired tension in the net. Furthermore, the arm enables to wrap root balls with different diameters with the same wrapping head. In an exemplar arrangement, a wrapping head is designed for root balls with a diameter in the range from 40 cm-70 cm. Other non-limiting examples of ranges are 70 cm-100 cm and 100 cm-150 cm diameter. In this embodiment the roll holder is preferably mounted on the second ring section, that is, on one end of the movable arm and the net spreader is pivotally connected to the other end of the movable arm.

The invention can be varied within the scope of the appended claims. For example, the rings may be mounted rotatable along an axis transverse to the centerline through the rings and tangential to the rings. This allows for more freedom to handle the wrapped tree, e.g. to place it on a vehicle for moving it to another location.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the scope of the appended claims.

The invention claimed is:

1. A method of preparing a plant for transport, said plant comprising a root system embedded in surrounding soil, and a woody member, the method comprising encompassing the root system together with the surrounding soil by wrapping an oblong band of flexible material around the root system and surrounding soil multiple times using a wrapping device, the wrapping device comprising a wrapping head and a gripper configured to hold the woody member of the plant, the wrapping head being configured to circle a band dispenser along a circular path in a plane of rotation at a first orientation and around a wrapping space of the wrapping head, wherein the wrapping head is rotatably coupled to the wrapping device to enable changing orientation of the plane of rotation with respect to gripper from the first orientation to a second orientation, different from the first orientation; and while the gripper keeps the root system in the wrapping space and the band dispenser continues to circle along the circular path, changing orientation of the plane of rotation with respect to the gripper from the first orientation to the second orientation to wrap the band along the root system with the plane of rotation at the second orientation.

2. The method according to claim 1, wherein the wrapping head comprises a first ring section and a second ring section movable in the first ring section, wherein the first ring section is rotatably coupled to the gripper and serves as a guide for rotating the second ring section in the first ring section, the band dispenser being attached to the second ring section, wherein the method further comprises rotating the second ring section in the first ring section.

3. The method according to claim 2, wherein the first ring section and the second ring section have corresponding openings that, when the openings coincide, form a side opening of the wrapping head, enabling placement of the root system of the plant in the wrapping space by horizontal displacement of the wrapping device, wherein the method further comprises displace horizontally the wrapping device to position the root system of the plant in the wrapping space.

4. The method according to claim 1, wherein the band dispenser comprises a roll holder and a net spreader configured for guiding the band from the roll holder to the root system, wherein the method further comprises guiding the band from the roll holder to the root system during wrapping of the root system by a net spreader.

5. The method according to claim 4, wherein the net spreader comprises a knife configured to cut the band lengthwise and the band is a tubular net, wherein the method further comprises cutting the tubular net lengthwise before wrapping the net around the root system.

6. The method according to claim 1, wherein the gripper is movable with respect to the wrapping head to change during wrapping the distance between the gripper and the wrapping space, wherein the method further comprises moving the root system vertically in the wrapping space by changing the distance between the gripper and the wrapping space.

7. The method according to claim 1, wherein at least during a first part of wrapping the band around the root system, wrapping the band around the root system and surrounding soil is performed while the plant is placed with the root system of the plant and surrounding soil on a support surface.

8. The method according to claim 7, wherein during a second part of wrapping the band around the root system, which occurs after the first part, wrapping the band around the root system and surrounding soil is performed, while the plant is lifted from the support surface and held by the woody member and with the root system at a distance from the earth, to envelope the root system and surrounding soil at the bottom side of said root system.

9. The method according to claim 1, wherein the plant is held by the woody member of the plant while wrapping the root system and surrounding soil is performed.

10. The method according to claim 1, wherein the band is a net.

11. The method according to claim 10, wherein the net is composed of threads that don't extend in longitudinal direction of the band.

12. The method according to claim 10, wherein the wrapping device comprises a wrapping head and a net spreader, wherein the net is a tubular net, the net is spread using the net spreader inserted into the tubular net, and the net spreader comprises a knife at a side facing away from the center of the wrapping head, and while wrapping is performed the tubular net is cut by the knife and the cut net is wrapped around the root system and surrounding soil.

13. The method according to claim 1, wherein the root system and surrounding soil are first wrapped in a rotational direction having an axis parallel to the centerline of the woody member, following which the plant is lifted and the root system and surrounding soil are wrapped in a rotational direction having an axis at an angle to the centerline of the woody member.

14. The method according to claim 13, wherein the wrapping device comprises a wrapping head and to change the angle of the rotational direction of wrapping the wrapping head is rotated while the woody member of the plant is held.

15. A method of preparing a plant for transport, said plant comprising
- a root system embedded in surrounding soil, and
- a woody member,
- wherein the method comprises the step of wrapping the root system together with the surrounding soil,
- wherein the step of wrapping the root system together with the surrounding soil comprises encompassing the root system together with the surrounding soil by wrapping an oblong band of flexible material around the root system and surrounding soil multiple times using a wrapping device,
- wherein the wrapping device comprises a ping head and a gripper configured to hold the woody member of the plant, the wrapping head being configured to circle a band dispenser along a circular path in a plane of rotation around a wrapping space of the wrapping head, wherein the wrapping head is rotatably coupled to the wrapping device to enable to change the orientation of the plane of rotation with respect to gripper, wherein the step of wrapping comprises:
  - the gripper keeping the root system in the wrapping space; and
  - circling the band dispenser along the circular path to wrap the band along the root system with circular paths in planes of rotation having multiple orientations,
- wherein the gripper is rotatable along an axis through the gripper and the wrapping space, and
- wherein the method further comprises rotating the root system in the wrapping space by rotating the gripper.

16. An apparatus comprising a mast, a wrapping device and a gripper, said wrapping device comprising a wrapping head comprising a first ring comprising a first opening and a moveable second ring comprising a second opening, wherein the first ring serves as a guide for the second ring, wherein the wrapping head is open for allowing access to the center of the rings when the first opening of the first ring coincides with the second opening of the second ring and the wrapping head is closed when the first opening of the first ring does not coincide with the second opening of the second ring, and wherein the wrapping head and the gripper are moveable along the mast.

17. A wrapping device for preparing a plant for transport, said plant comprising a root system embedded in surrounding soil and a woody member, the wrapping device comprising a wrapping head and a gripper configured to hold the woody member of the plant;
- the wrapping head being configured to circle a band dispenser along a circular path in a plane of rotation around a wrapping space of the wrapping head, wherein the wrapping head is rotatably coupled to the wrapping device to allow changing the orientation of the plane of rotation relative to the direction of the woody member of the plant held by the gripper while the gripper keeps the root system in the wrapping space and the band dispenser continues to circle along the circular path.

18. The wrapping device according to claim 17, wherein the wrapping head comprises a first ring section and a second ring section movable in the first ring section, wherein the first ring section is rotatably coupled to the gripper and serves as a guide for rotating the second ring section in the first ring section, the band dispenser being attached to the second ring section.

19. The wrapping device according to claim 18, wherein the first ring section and the second ring section have corresponding openings that, when the openings coincide, form a side opening of the wrapping head, enabling placement of the root system of the plant in the wrapping space by horizontal displacement of the wrapping device.

20. The wrapping device according to claim 17, wherein the band dispenser comprises a roll holder and a net spreader configured for guiding the band from the roll holder to the root system.

21. The wrapping device according to claim 20, wherein the net spreader comprises a knife configured to cut the band lengthwise.

22. The wrapping device according to claim 17, wherein the gripper is rotatable along an axis through the gripper and the wrapping space.

23. The wrapping device according to claim 17, wherein the gripper is movable with respect to the wrapping head to change during wrapping the distance between the gripper and the wrapping space.

* * * * *